3,334,104
CERTAIN SUBSTITUTED PIPERIDYL
SULFAMIDES
William J. Houlihan, Mountain Lakes, N.J., assignor to
Sandoz Inc., Hanover, N.J.
No Drawing. Filed Dec. 18, 1964, Ser. No. 419,608
3 Claims. (Cl. 260—293.4)

This invention is directed to a particular class of sulfamides which have anti-inflammatory properties and to the use of said sulfamides as anti-inflammatories. The subject compounds have the structure

wherein R is

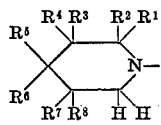

e.g. 3-methylpiperidyl;

each of $R^1$, $R^2$, $R^3$, $R^4$, $R^5$, $R^6$, $R^7$ and $R^8$ is either a hydrogen atom (—H) or one of the following functional groups: lower alkyl, e.g., methyl, ethyl, propyl, isopropyl and butyl; aryl of the formula

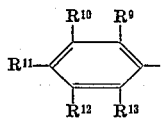

e.g. phenyl;
ar(lower)alkyl of the formula

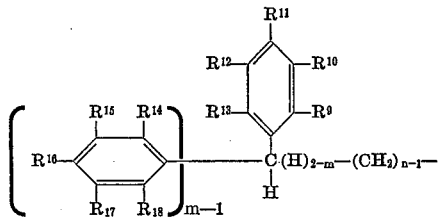

e.g., benzyl and phenethyl; and cycloalkyl having from 5 to 7 carbon atoms, e.g., cyclopentyl, cyclohexyl and cycloheptyl; with the proviso that there are no more than three of said functional groups on any two adjacent carbon atoms, a plurality of cycloalkyl groups are not bound to adjacent carbon atoms; and at most seven of $R^1$, $R^2$, $R^3$, $R^4$, $R^5$, $R^6$, $R^7$ and $R^8$ are hydrogen atoms;

each of $R^1$ and $R^2$ taken together, $R^3$ and $R^4$ taken together, $R^5$ and $R^6$ taken together, and $R^7$ and $R^8$ taken together alternatively form with the ring carbon atom to which they are bound a saturated carbocyclic ring having from 5 to 7 carbon atoms, e.g., 2,2-tetramethylene, 3,3-pentamethylene and 4,4-hexamethylene; with the proviso that adjacent carbon atoms do not form polymethylene rings;

each of $R^9$, $R^{10}$, $R^{11}$, $R^{12}$, $R^{13}$, $R^{14}$, $R^{15}$, $R^{16}$, $R^{17}$ and $R^{18}$ is either a hydrogen atom (—H); a chlorine atom (—Cl); a fluorine atom (—F); a bromine atom (—Br); lower alkyl, e.g., methyl, ethyl, propyl, isopropyl and butyl; lower alkoxy, e.g., methoxy, ethoxy, propoxy, isopropoxy and butoxy; trifluoromethyl (—$CF_3$); or lower alkylthio, e.g., methylthio, ethylthio, propylthio, isopropylthio and butylthio;

each of $R^9$ and $^{10}$ taken together, $R^{10}$ and $R^{11}$ taken together, $R^{11}$ and $R^{12}$ taken together, $R^{12}$ and $R^{13}$ taken together, $R^{14}$ and $R^{15}$ taken together, $R^{15}$ and $R^{16}$ taken together, $R^{16}$ and $R^{17}$ taken together, and $R^{17}$ and $R^{18}$ taken together are alternatively bound to methylenedioxy (—O—$CH_2$—O—); with the proviso that (a) at least one of $R^9$, $R^{10}$, $R^{11}$, $R^{12}$ and $R^{13}$ and at least one of $R^{14}$, $R^{15}$, $R^{16}$, $R^{17}$ and $R^{18}$ are hydrogen atoms, (b) a plurality of trifluoromethyl groups are not bound to adjacent carbon atoms, (c) all of $R^9$, $R^{13}$, $R^{14}$ and $R^{18}$ of aryl and aralkyl groups are hydrogen atoms in a plurality of such groups attached to the same ring carbon, (d) each $R^9$ and $R^{14}$ of aryl and aralkyl groups are hydrogen atoms in a plurality of such groups attached to adjacent ring carbon atoms and (e) $R^9$ and $R^{13}$ of an aryl group and $R^{14}$ and $R^{18}$ of an aralkyl group bound to the same carbon atom as a cycloalkyl group are hydrogen atoms;

each of $m$ and $n$ is either 1 or 2; and

R' is preferably primary amine (—$NH_2$); but is alternatively lower alkyleneimino, e.g., ethylenimino and piperidino.

Compounds within the scope of this invention include both geometric (cis- and trans-) and stereoisomers.

For those compounds which have asymmetric carbon atoms both the individual stereoisomers and the racemic mixtures are within the scope of this invention. Compounds I are prepared by reacting a piperidine, RH, with sulfamide. An inert solvent medium (one which reacts neither with the reactants nor the subject compounds under the reaction conditions) may be used, but is not required. The reaction takes place by simple admixture of the stated reactants at a temperature within the range of from 50° to 200° C. When a solvent medium is employed, the solvent is preferably a tertiary amino, such as a tri(lower)alkylamine, e.g., triethylamine; and an aryldi(lower)alkylamine, e.g., phenyldimethylamine; but other solvents may also be employed. Examples of other suitable solvents are lower N-alkyl pyrrole, pyridine, lower alkyl pyridine, lower alkoxy pyridine, quinoline, lower alkyl quinoline, lower alkoxy quinoline, N-(lower)alkyl morpholine, N-aryl morpholine and N,N'di(lower)alkylpiperazine. [In the enumeration of solvents, each lower alkyl and the alkyl of each lower alkoxy are, e.g., methyl, ethyl, propyl, isopropyl and butyl; and each aryl (or ar-) is preferably phenyl.]

Although stirring is preferred, it is not necessary. The reaction proceeds to completion in from one to five hours. This reaction produces the preferred compounds.

According to this invention, these compounds are of the formula

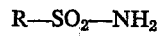

To prepare compounds of Formula I, other than primary amines, II, an alternate two-step procedure is employed.

As a first step, a piperidine, RH, is admixed with sulfuryl chloride, $SO_2Cl_2$, at a lower temperature, i.e., one within a range of from —50° to 0° C., in a solvent medium, whereby an intermediate of the formula

is prepared

As a second step intermediate III is reacted by contacting same with an amine, R'H. When R'H is ammonia, the reaction is alternatively with liquid ammonia or by admixing Compound III with a diethylether solution of ammonia at a temperature of less than 20° C.

The reaction with sulfonyl chloride is effected by simple admixture with continuous stirring and takes from one to five hours. The solvent medium is an inert solvent, i.e., the solvent reacts under the contemplated conditions with neither the reactants nor the intermediate (III) which the reaction produces. Any inert solvent can be used, e.g., di(lower)alkylethers, such as diethylether; hydrocarbons, such as benzene; lower mono, di-, tri- and polychloroalkanes, such as 1-propyl chloride, 1,1-dichloro-

TABLE I.—COMPOUND I

| | R¹ | R² | R³ | R⁴ | R⁵ | R⁶ | R⁷ | R⁸ | R⁹ |
|---|---|---|---|---|---|---|---|---|---|
| | —H | —(CH₂)₆— | —H | —H | —CH₂—(3-F,5-OPr-C₆H₃) | —H | —(CH₂)₆— | | —NH₂ |
| | —H | —H | cyclohexyl | —H | —H | —H | —H | —H | N-pyrrolidinyl |
| | —H | —H | —H | —OBu—C₆H₄— | —(CH₂)₂—C₆H₅ | —H | —Me | —Et | —NH₂ |
| | —H | —H | —H | —H | —H | —H | —H | —H | N-piperidinyl |
| | —Me | —H | —H | —CF₃—C₆H₄— | —H | —(CH₂)₄— | —H | —H | —NH₂ |
| | —CH₂—(2-Cl,SEt-C₆H₃) | cyclopentyl | —H | —Me | —Bu | —H | —H | —H | —NH₂ |
| | —H | —CH₂—(2-Me,3-F,5-Et-C₆H₂) | —H | —CH₂—(2-Br,4-Pr-C₆H₃) | —H | —H | —Me | —Me | —NH₂ |
| | —H | —H | 3,4-methylenedioxyphenyl | —H | —H | —(3-SMe,4-iPr-C₆H₃) | —H | —H | N-piperidinyl | ethane, 1,1,3-trichloropropane; cyclic monoethers, such as tetrahydrofuran; and cyclic diethers, such as dioxane. In addition to the inert solvent, as exemplified, one or more tertiary amines, such as enumerated for the reaction with sulfamide, may also be present as part of the reaction medium.

The reaction between R'H and Compound III is actually a general reaction.

Exemplary compounds I are those set forth in the above table by the definition of $R^1$, $R^2$, $R^3$, $R^4$, $R^5$, $R^6$, $R^7$, $R^8$ and $R'$. Although the table does not specifically designate those compounds which have asymmetric carbon atoms, geometric and stereoisometric forms (as well as racemic mixtures and racemates) are contemplated wherever applicable. All Compounds I are either prepared from known starting materials according to the preceding description or are prepared from starting materials which are readily prepared according to known pocedures from available compounds. In the table in addition to the standard elemental abbreviations the following definitions are employed:

Me—methyl           iPr—isopropyl
Et—ethyl            Bu—butyl
Pr—propyl

In addition to other pharmacological properties, the compounds of this invention are useful as anti-inflammatories. They are administered either orally or parenterally. The average daily dose may vary within the range of from 25 milligrams to 50 milligrams.

Oral dosage forms include tablets and capsules having standard fillers and other compound ingredients. Each of the pharmaceutically active compounds of this invention may be, e.g., incorporated for oral administration, in a tablet as the sole active ingredient. A typical tablet is constituted by from 1 to 3 percent binder, e.g., tragacanth; from 3 to 10 percent disintegrating agent, e.g., cornstarch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known to the art, employing the necessary amounts of conventional granulating liquids, e.g., alcohol SD–30 and purified water. An exemplary tabletting formulation for the instant active compounds is:

| | Parts |
|---|---|
| Title compound of Example 5 | 33 |
| Tragacanth | 2 |
| Lactose | 56.5 |
| Corn starch | 5 |
| Talcum | 3 |
| Magnesium stearate | 0.5 |
| Alcohol SD–30 | q.s. |
| Purified water | |

The following examples illustrate the invention, all temperatures being in degrees centigrade, the parts and percentages being by weight unless otherwise specified, and the relationship between parts by weight and parts by volume being the same as that between the kilogram and the liter.

EXAMPLE 1

4-benzyl-N-sulfamoylpiperidine

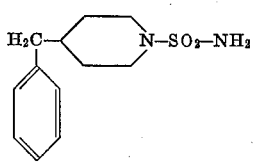

Stir and reflux an admixture of 17.5 parts (0.1 mole) of 4-benzylpiperidine, 10.6 parts (0.11 mole) of sulfamide and 100 parts by volume of pyridine for about fifteen hours. Cool the resulting product to room temperature (20°). During the cooling a crystalline material separates. Filter off the crystalline material and crystallize same from ethanol/water. There are thus obtained 7.0 parts of title compound, melting point (M.P.) 124° to 126°.

Replacing the 4-benzylpiperidine with an equivalent of either 4-phenethylpiperidine or 2-benzylpiperidine results in the preparation of the corresponding N-sulfamoylpiperidine.

EXAMPLE 2

2-methyl-5-ethyl-N-sulfamoylpiperidine

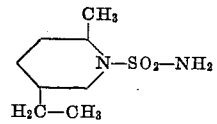

Stir and reflux an admixture of 12.7 parts (0.1 mole) of 2-methyl-5-ethylpiperidine, 11.5 parts (0.12 mole) of sulfamide and 100 parts by volume of pyridine for about fifteen hours. Cool the resulting product to room temperature. During the cooling a crystalline material precipitates. Filter off the crystalline material and crystallize same from ethanol/water. There are thus obtained 4.5 parts of title compound, M.P. 109.5° to 110.5°.

Replacing the 5-ethyl-2-methylpiperidine with an equivalent of either 2,5-diethyl-3-methylpiperidine or 2,5-dimethyl-3-ethylpiperidine results in the preparation of the corresponding N-sulfamoylpiperidine.

EXAMPLE 3

4-n-propyl-N-sulfamoylpiperidine

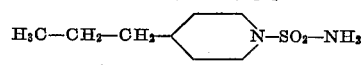

Stir and reflux an admixture of 12.7 parts (0.1 mole) of 4-n-propylpiperidine, 10.6 parts (0.11 mole) of sulfamide and 100 parts by volume of pyridine for about fifteen hours. Cool the resulting product to room temperature. During the cooling a crystalline material precipitates. Filter off the crystalline material, and crystallize same from ethanol/water. There are thus obtained 10.1 parts of the title compound, M.P. 127° to 128°.

Replacing the 4-n-propylpiperidine with an equivalent of either 3-n-propylpiperidine or 4-i-propylpiperidine results in the preparation of the corresponding N-sulfamoylpiperidine.

EXAMPLE 4

2-n-propyl-N-sulfamoylpiperidine

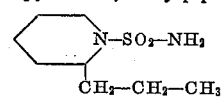

Stir and reflux an admixture of 12.7 parts (0.1 mole) of 2-n-propylpiperidine, 10.6 parts (0.11 mole) of sulfamide and 100 parts by volume of pyridine for about fifteen hours. Cool the resulting product to room temperature. During the cooling a crystalline material precipitates. Filter off the crystalline material and crystallize same from ethanol/water. There are thus obtained 10.0 parts of title compound, M.P. 76° to 76.5°.

Replacing the 2-n-propylpiperidine with an equivalent of either 2-i-propylpiperidine or 2,3-diisopropylpiperidine results in the preparation of the corresponding N-sulfamoylpiperidine.

EXAMPLE 5

4-methyl-N-sulfamoylpiperidine

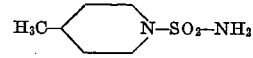

Stir and reflux an admixture of 9.9 parts (0.1 mole) of 4-methylpiperidine, 10.6 parts (0.11 mole) of sulfamide and 100 parts by volume of pyridine for about fifteen hours. Cool the resulting product to room temperature. During the cooling a crystalline material precipitates. Filter off the crystalline material, and crystallize same from ethanol/water. There are thus obtained 14.3 parts of title compound, M.P. 126° to 126.5°.

Replacing the 4-methylpiperidine with an equivalent of either 2-ethylpiperidine, 3-butylpiperidine or 2,3,4,6-tetramethylpiperidine results in the preparation of the corresponding N-sulfamoylpiperidine.

EXAMPLE 6

*3-methyl-N-sulfamoylpiperidine*

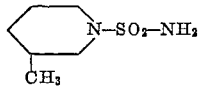

Stir and reflux an admixture of 9.9 parts (0.1 mole) of 3-methylpiperidine, 10.6 parts (0.11 mole) of sulfamide and 100 parts by volume of pyridine for about fifteen hours. Cool the resulting product to room temperature. During the cooling a crystalline material precipitates. Filter off the crystalline material, and crystallize same from ethanol/water. There are thus obtained 12.8 parts of title compound, M.P. 101.5° to 102.5°.

Replacing the 3-methylpiperidine with an equivalent of either 2,3-dimethylpiperidine, 2,3,5-trimethylpiperidine or 2,3,6-trimethylpiperidine results in the preparation of the corresponding N-sulfamoylpiperidine.

EXAMPLE 7

*3-methyl-dipiperidinosulfone*

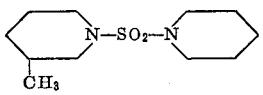

Admix 0.2 mole of 3-methylpiperidine and 150 parts by volume of dry diethylether with 0.1 mole of sulfuryl chloride at $-10°$, and retain the reaction mixture at that temperature for about three hours. Thereafter admix the obtained product (without separation) with 0.2 mole of piperidine. Maintain the resultant at a temperature of at most 20°. Evaporate the solven to obtain the title compound.

EXAMPLE 8

*N-sulfamoyl-4-phenylpiperidine*

Stir and reflux an admixture of 16.1 parts (0.1 mole) of 4-phenylpiperidine, 10.6 parts (0.11 mole) of sulfamide and 100 parts by volume of pyridine for about fifteen hours. Cool the resulting product to room temperature. During the cooling a crystalline material separates. Filter off the crystalline material and crystallize same from ethanol/water. There are thus obtained 13.1 parts of title compound, M.P. 179° to 181.5°.

Replacing the 4-phenylpiperidine with an equivalent of either 3-phenylpiperidine or 2,5-diphenylpiperidine results in the preparation of the corresponding N-sulfamoylpiperidine.

EXAMPLE 9

*N-sulfamoyl-4-benzhydrylpiperidine*

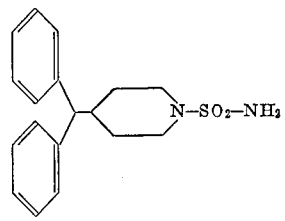

Stir and reflux an admixture of 12.5 parts (0.05 mole) of 4-benzhydrylpiperidine, 5.75 parts (0.06 mole) of sulfamide and 100 parts by volume of pyridine for about fifteen hours. Cool the resulting product to room temperature. During the cooling a crystalline material separates. Filter off the crystalline material and crystallize same from ethanol/water. There are thus obtained 6.0 parts of title compound, M.P. 202° to 204°.

Replacing the 4-benzhydrylpiperidine with an equivalent of either 4-(4,4'-dimethylbenzhydryl)-piperidine or 4-(3,4-methylenedioxy - 3',5' - bis-trifluoromethylbenzhydryl)-piperidine results in the preparation of the corresponding N-sulfamoylpiperidine.

EXAMPLE 10

*N-sulfamoyl-3-ethylpiperidine*

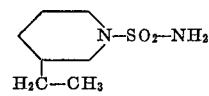

Stir and reflux an admixture of 11.3 parts (0.1 mole) of 3-ethylpiperidine, 11.5 parts (0.12 mole) of sulfamide and 150 parts by volume of pyridine for about fifteen hours. Cool the resulting product to room temperature. During the cooling a crystalline material separates. Filter off the crystalline material and crystallize same from ethanol/water. There are thus obtained 12.5 parts of a mixture of cis- and trans-isomers of the title compound, M.P. 146° to 148°.

Replacing the 3-ethylpiperidine with an equivalent of either 4-ethylpiperidine or 3,6-diethylpiperidine results in the preparation of the corresponding N-sulfamoylpiperidine.

EXAMPLE 11

*N-sulfamoyl-3,5-dimethylpiperidine*

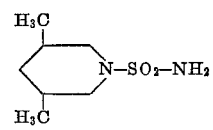

Stir and reflux an admixture of 11.3 parts (0.1 mole) of a mixture of cis- and trans-3,5-dimethylpiperidine, 11.5 parts (0.12 mole) of sulfamide and 150 parts by volume of pyridine for about fifteen hours. Cool the resulting product to room temperature. During the cooling a crystalline material separates. Filter off the crystalline material and crystallize same from ethanol/water. There are thus obtained 12.5 parts of a mixture of cis- and trans-isomers of the title compound, M.P. 146° to 148°.

Replacing the mixture of cis- and trans-3,5-dimethylpiperidine with an equivalent of either cis-3,5-dimethylpiperidine or trans-3,5-dimethylpiperidine results in the preparation of the corresponding N-sulfamoylpiperidine.

EXAMPLE 12

*N-sulfamoyl-3-methyl-4-ethylpiperidine*

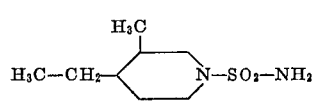

Stir and reflux an admixture of 12.7 parts (0.1 mole) of a mixture of cis- and trans-3-methyl-4-ethylpiperidine, 11.5 parts (0.12 mole) of sulfamide and 150 parts by volume of pyridine for about fifteen hours. Cool the resulting product to room temperature. During the cooling a crystalline material separates. Filter off the crystalline material and crystallize same from ethanol/water. There are thus obtained 15.5 parts of a mixture of cis- and trans-isomers of the title compound, M.P. 102° to 104°.

Replacing the mixture of cis- and trans-3-methyl-4-ethylpiperidine with an equivalent of either cis-3-methyl-4-ethylpiperidine or trans-3-methyl-4-ethylpiperidine results in the preparation of the corresponding N-sulfamoylpiperidine.

EXAMPLE 13

*N-sulfamoyl-3,4-dimethylpiperidine*

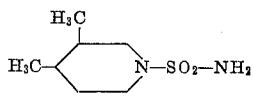

Stir and reflux an admixture of 11.3 parts (0.1 mole) of cis- and trans-3,4-dimethylpiperidine, 11.5 parts (0.12 mole) of sulfamide and 150 parts by volume of pyridine for about fifteen hours. Cool the resulting product to room temperature. During the cooling a crystalline material separates. Filter off the crystalline material and crystallize same from ethanol/water. There are thus obtained 12.5 parts of a mixture of cis- and trans-isomers of the title compound, M.P. 89° to 90°.

EXAMPLE 14

*N-sulfamoyl-2,5-dimethylpiperidine*

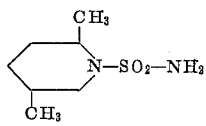

Stir and reflux an admixture of 11.3 parts (0.1 mole) of cis- and trans-2,5-dimethylpiperidine and 11.5 parts (0.12 mole) of sulfamide and 150 parts by volume of pyridine for about fifteen hours. Cool the resulting product to room temperature. During the cooling a crystalline material separates. Filter off the crystalline material and crystallize same from ethanol/water. There are thus obtained 8.7 parts of cis- and trans-isomers of the title compound, M.P. 88° to 90°.

EXAMPLE 15

*N-sulfamoyl-3-methyl-3-phenylpiperidine*

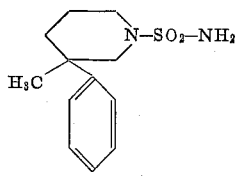

Stir and reflux an admixture of 17.5 parts (0.1 mole) of 3-methyl-3-phenylpiperidine, 11.5 parts (0.12 mole) of sulfamide and 150 parts by volume of pyridine for about fifteen hours. Cool the resulting product to room temperature and filter off the thus-precipitated crystalline title compound.

Replacing the 3-methyl-3-phenylpiperidine with an equivalent of either 4-methyl-4-phenylpiperidine or 3,5-dimethyl-3,5-diphenylpiperidine results in the preparation of the corresponding N-sulfamoylpiperidine.

EXAMPLE 16

*N-sulfamoyl-3,3-diphenylpiperidine*

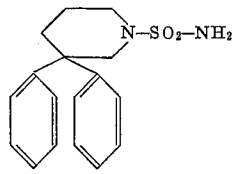

Stir and reflux an admixture of 23.7 parts (0.1 mole) of 3,3-diphenylpiperidine, 11.5 pars (0.12 mole) of sulfamide and 150 parts by volume of pyridine for about fifteen hours. Cool the resulting product to room temperature and filter off the thus-precipitated crystalline title compound.

Replacing the 3,3-diphenylpiperidine with an equivalent of either 4,4-diphenylpiperidine or 3,3,6,6-tetraphenylpiperidine results in the preparation of the corresponding N-sulfamoylpiperidine.

Various changes may be made in the structures of Compounds I without departing from the spirit or scope of the invention or sacrificing its material advantages. The examples merely provide illustrative embodiments.

What is claimed is:

1. A compound having the structure

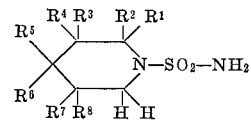

wherein each of $R^1$, $R^2$, $R^3$, $R^4$, $R^5$, $R^6$, $R^7$ and $R^8$ is a member selected from the group consisting of a hydrogen atom, lower alkyl, a substituent of the formula

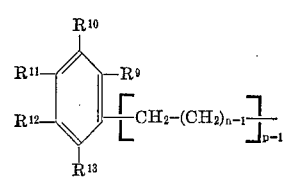

cycloalkyl having from 5 to 7 carbon atoms, and, combined with the member bonded to the same carbon atom, polymethylene having from 5 to 6 carbon atoms; at most seven of $R^1$, $R^2$, $R^3$, $R^4$, $R^5$, $R^6$, $R^7$ and $R^8$ being hydrogen atoms and at least one of same being a substituent of said formula; at most three of said members other than hydrogen being bonded to adjacent ring carbon atoms; and no two of the polymethylenes being bonded to adjacent ring carbon atoms;

each of $R^9$, $R^{10}$, $R^{11}$, $R^{12}$ and $R^{13}$ is a member selected from the group consisting of a hydrogen atom, a chlorine atom, a fluorine atom, a bromine atom, lower alkyl, lower alkoxy, trifluoromethyl, lower alkylthio, and, together with the member on an adjacent ring carbon atom, methylenedioxy; at least one of $R^9$, $R^{10}$, $R^{11}$, $R^{12}$, and $R^{13}$ being a hydrogen atom; no two trifluoromethyl groups being bound to adjacent carbon atoms; each of $R^9$ and $R^{13}$ being a hydrogen atom for two aryl groups bound to the same carbon atom of the piperidyl ring; each $R^9$ being a hydrogen atom for two aryl groups bound to adjacent carbon atoms of the piperidyl ring; and each of $R^9$ and $R^{13}$ being a hydrogen atom for an aryl group bound to the same piperidyl ring carbon atom as a cycloalkyl group and each of $n$ and $p$ being one of the integers 1 and 2.

2. 4-benzyl-N-sulfamoylpiperidine.
3. N-sulfamoyl-4-phenylpiperidine.

References Cited

UNITED STATES PATENTS 2,898,339   8/1959   Wheeler et al. _____ 260—293.47
3,242,174   3/1966   McManus et al.

OTHER REFERENCES

Fuhrman et al.: J. Am. Chem. Soc., vol. 67 (1945) pp. 1245–46.

Vandi et al.: J. Org. Chem., vol. 26 (1961) pp. 1136–38.

ALEX MAZEL, *Primary Examiner.*

R. J. GALLAGHER, *Assistant Examiner.*